April 24, 1956
D. RICHMAN
SIGNAL-SEPARATING CIRCUIT FOR
A COLOR-TELEVISION RECEIVER
Filed May 10, 1954
2,743,311
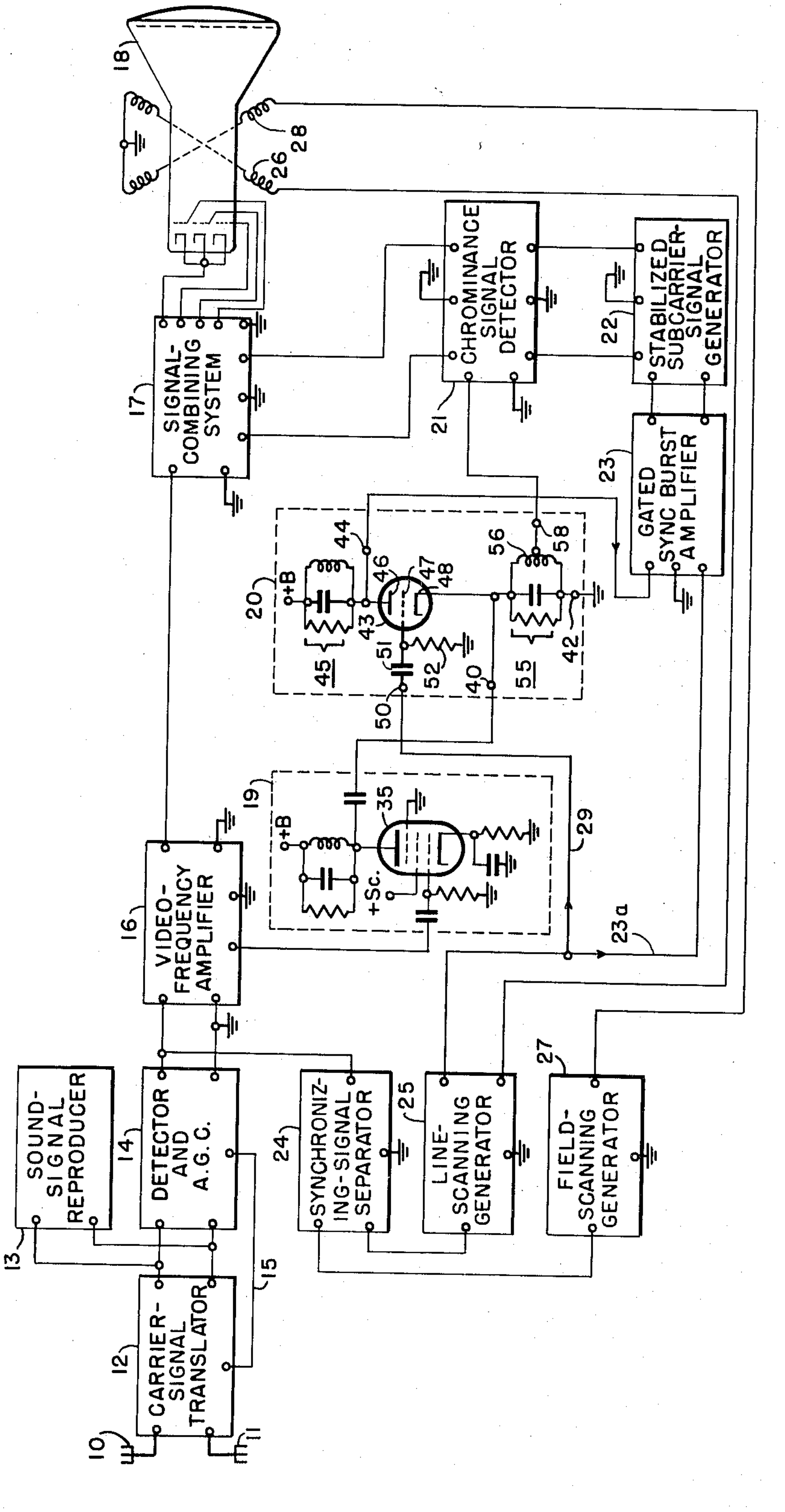

2,743,311

SIGNAL-SEPARATING CIRCUIT FOR A COLOR-TELEVISION RECEIVER

Donald Richman, Fresh Meadows, N. Y., assignor to Hazeltine Research, Inc., Chicago, Ill., a corporation of Illinois Application May 10, 1954, Serial No. 428,775
9 Claims. (Cl. 178—5.4)

*General*

This invention relates to signal-separating circuits for color-television receivers and, particularly, to a novel signal-separating circuit for separating the color-synchronizing signal component from the video signal component of a composite color-television signal.

In a color-television receiver for receiving a composite color-television signal in accordance with the FCC approved NTSC signal specifications, it is necessary that the chrominance video component be separated from the composite signal and supplied to a chrominance-signal detector for obtaining the desired color information. It is also necessary that the color-synchronizing component be separated from the composite signal and supplied to the appropriate phase-synchronizing and control circuits customarily associated with the subcarrier-signal reference oscillator of the receiver. In order to minimize degradation in the reproduced color image, it is desirable that the color-synchronizing component not be allowed to enter the chrominance-signal detector. Also, in order to prevent spurious synchronization of the subcarrier-signal reference oscillator, it is highly desirable that only the color-synchronizing component be supplied to the phase-synchronizing and control circuits. In order to achieve these desired results, it has been the practice in color-televsion receivers heretofore proposed to supply the signal components through two separate keyed or gated amplifier circuits individually coupled to the input terminals of the chrominance-signal detector and the phase-synchronizing circuit, each of the gated amplifier circuits being rendered translatory only during the time of occurrence of the signal component desired to be translated thereby. Such a system, however, requires more circuit components and thus is more expensive than may be desirable for some applications.

It is an object of the invention, therefore, to provide a new and improved signal-separating circuit for a color-television receiver which avoids the foregoing limitations of such circuits heretofore proposed.

It is another object of the invention to provide a new and improved signal-separating circuit for a color-television receiver wherein a single-tube circuit provides substantially complete separation of color-synchronizing and video signal components and further serves advantageously to modify the characteristics of one of the signal components.

In accordance with the invention, a signal-separating circuit for a color-television receiver for separating the color-synchronizing signal component from the video signal component of a composite color-television signal comprises circuit means for supplying a composite color-television signal having time-spaced color-synchronizing and video signal components. The signal-separating circuit also includes a first signal-translating channel coupled to the composite-signal supply-circuit means and including repeater-circuit means having first and second operating modes and normally operating in the first mode, one of the operating modes being a translatory operating mode for enabling the first channel to translate only a first of the signal components. The signal-separating circuit further includes circuit means for supplying recurrent gating pulses for enabling the repeater means to operate in the second mode. The signal-separating circuit additionally includes a second signal-translating channel coupled to the composite-signal supply-circuit means and coupled to the repeater means and responsive to its other operating mode, such other mode being a nontranslatory operating mode for the repeater means, for translating substantially only a second of the signal components.

For a better understanding of the present invention, together with other and further objects thereof, reference is had to the following description taken in connection with the accompanying drawing, and its scope will be pointed out in the appended claims.

The single figure of the drawing is a circuit diagram, partly schematic, of a complete color-television receiver including a signal-separating circuit constructed in accordance with the present invention.

*Description and operation of the color-television receiver*

Referring to the drawing, the color-television receiver there represented comprises an antenna system 10, 11, of conventional construction, for supplying a received composite color-television signal to a carrier-signal translator 12. The carrier-signal translator 12 may include, for example, a radio-frequency amplifier, an oscillator-modulator, and an intermediate-frequency amplifier, all of conventional construction. These units serve to amplify the received composite signal and change its carrier frequency to an intermediate-frequency value. The intermediate-frequency composite signal is, in turn, supplied to a sound-signal reproducer 13 which is effective to extract the sound carrier therefrom, detect the audio-signal component thereof, and utilize the same to reproduce sound. To this end, the sound-signal reproducer 13 may include a sound intermediate-frequency amplifier, a frequency-modulation signal detector, an audio-frequency amplifier, and a loudspeaker, all of conventional construction.

The intermediate-frequency composite signal is also supplied to a detector and A. G. C. unit 14 of conventional construction. The A. G. C. portion of unit 14 is effective to supply a control voltage to appropriate stages of the carrier-signal translator 12 by means of conductor 15 for automatically controlling the gain of those stages in a conventional manner. The detector portion of unit 14 serves to extract the composite video signal from the intermediate-frequency composite signal and supply the composite video signal to a video-frequency amplifier 16 preferably of a conventional low-pass type which, in turn, supplies a portion of the composite video signal representing the luminance component thereof to a signal-combining system 17.

The color-television receiver also includes a band-pass video-frequency amplifier 19, of conventional construction, coupled, for example, to an intermediate stage of the video-frequency amplifier 16 for translating the chrominance component of the composite video signal. The band-pass amplifier 19 amplifies the chrominance component and supplies it to a signal-separating circuit 20 constructed in accordance with the present invention as will be mentioned more fully hereinafter. The signal-separating circuit 20 is effective to supply substantially only the chrominance component of the composite video signal to a chrominance-signal detector 21. The chrominance-signal detector 21 may comprise, for example, a pair of synchronous detectors for separating the now standardized I and Q components of the chrominance signal. The chrominance-signal detector 21 supplies these I and Q signals to the signal-combining system 17 which may include, for example, suitable signal-amplifying, inverting, and matrixing circuits, all of conventional construction. The signal-combining system 17 is effective to combine portions of the I, Q, and luminance signals to derive the desired red, green, and blue chrominance signals which, in turn, are supplied to corresponding control electrodes of the picture tube 18.

The color-synchronizing component or "sync burst" portion of the composite video signal is also supplied by the video-frequency amplifier 16 through the band-pass amplifier 19 to the signal-separating circuit 20. The signal-separating circuit 20 is effective, as will be mentioned more fully hereinafter, to translate substantially only this color-synchronizing component to a gated sync burst amplifier 23 which, in turn, is coupled to a stabilized subcarrier-signal generator 22 of conventional phase-controlled oscillator construction. The generator 22 supplies a pair of subcarrier-frequency reference signals differing from each other in phase by 90° to the chrominance-signal detector 21 for enabling synchronous detection of the I and Q components of the chrominance signal. The reference signals are maintained in proper synchronization with the received composite signal in a conventional manner by means of the action of the color-synchronizing component on the unit 22.

The "sync burst" amplifier 23 may not have to be of the "gated" type because substantially complete signal separation is obtained in the signal-separator circuit 20. It may still be desirable, however, to use an amplifier of the "gated" type in order to obtain greater amplification for a given power-dissipation rating of the tube employed in the unit 23. In this case, the amplifier 23 may be "gated," as indicated on the drawing, by obtaining suitable gating pulses from a conventional line-scanning generator 25 by way of conductor **23*a***.

The color-television receiver also includes a conventional synchronizing-signal separator 24 which may be coupled, for example, to the output of the detector 14 for translating and separating the line-synchronizing and field-synchronizing components of the composite video signal. The line-synchronizing component is supplied to a conventional line-scanning generator 25 and is effective to control generation of suitable recurrent line-scanning signals therein. The line-scanning signals are, in turn, supplied to an appropriate horizontal deflection winding 26 associated with the picture tube 18. In a like manner, the field-synchronizing signals are supplied to a conventional field-scanning generator 27 and are effective to control generation of field-scanning signals therein which, in turn, are supplied to an appropriate vertical deflection winding 28 also associated with the picture tube 18. The line-scanning generator 25 also supplies recurrent gating pulses of line-scanning frequency to the signal-separating circuit 20 by way of conductor 29.

The antenna system 10, 11 and units 12–28, inclusive, with the exception of the signal-separating circuit 20, may be of conventional construction and operation so that a detailed description and explanation of the operation thereof are unnecessary herein.

*Description of the signal-separating circuit*

Referring to the drawing, there is represented a signal-separating circuit 20 constructed in accordance with the present invention and comprising circuit means for supplying a composite color-television signal having time-spaced color-synchronizing and video signal components. The composite-signal supply-circuit means may include, for example, the input terminals 40, 42 of the signal-separating circuit 20 connected to the band-pass video-frequency amplifier 19. The band-pass amplifier 19 preferably utilizes a pentode electron-discharge tube 35 and, hence, the output circuit of amplifier 19 may be considered for explanatory purposes as a constant-current type source of color-synchronizing and video signal components.

The signal-separating circuit 20 also comprises a first signal-translating channel coupled to the composite-signal supply-circuit means 19 and including repeater circuit means having first and second operating modes and normally operating in the first mode, one of the operating modes being a translatory operating mode for enabling the first channel to translate only a first of the signal components. The repeater circuit means may be, for example, an electron-discharge device 43 having an anode 46, a control electrode 47, and a cathode 48 and having nonconductive and conductive operating modes and normally operating, for example, in the non-conductive mode. The first signal-translating channel, in addition to the tube 43, may include a first tuned circuit or impedance network 45, output terminals 44, 42 of the signal-separating circuit 20, and connections to the sync burst amplifier 23. The anode 46 of tube 43 is connected to the first tuned circuit 45 and to the output terminals 44 of the signal-separating circuit 20 and is coupled through the tuned circuit 45 and source +B to the terminal 42. The tuned circuit 45 is preferably tuned to the subcarrier frequency of the chrominance component of the composite received signal which frequency may be, for example, 3.58 megacycles.

The signal-separating circuit 20 further includes circuit means for supplying recurrent gating pulses to the control electrode 47 of the electron-discharge device or tube 43 for enabling the tube 43 to operate in, for example, the conductive mode. The gating-pulse supply-circuit means may include, for example, conductor 29, input terminals 50, 42 of the signal-separating circuit 20, a coupling condenser 51, and a grid-leak resistor 52 connected to the line-scanning generator 25.

The signal-separating circuit 20 also includes a second signal-translating channel coupled to the composite-signal supply-circuit means 40, 42 and coupled to the repeater circuit means 43 and responsive to its other operating mode, such other mode being a nontranslatory operating mode for the repeater means 43, for translating substantially only a second of the signal components supplied by the supply-circuit means 40, 42. The second signal-translating channel may include, for example, a second tuned circuit or impedance network 55 and output terminals 58, 42 of the signal-separating circuit 20 connected to the chrominance-signal detector 21. The second tuned circuit 55 is connected to the cathode 48 of the electron-discharge device 43. The inductor 56 of the tuned circuit 55 has a suitable tap point connected to the output terminal 58 of the signal-separating circuit 20. The tuned circuit 55 is, also, preferably tuned to the subcarrier frequency which may be, for example, 3.58 megacycles.

*Operation of the signal-separating circuit*

Considering the operation of the signal-separating circuit 20 just described, the tube 43 is normally maintained nonconductive by the grid-inserter action of the control electrode-cathode circuit of tube 43, condenser 51, and resistor 52 activated by recurrent positive gating pulses supplied by the line-scanning generator 25. These gating pulses also are effective to render the tube 43 conductive only during the line-synchronizing or retrace intervals of the composite color-television signal. The color-synchronizing component of the composite color-television signal occurs during these same line retrace intervals.

Assuming for the moment that the tube 43 is nonconductive, the portion of the composite video signal supplied by amplifier 19 to the input terminals 40, 42 representing the chrominance video component is developed across the tuned circuit 55. A portion of the chrominance component is, in turn, supplied by the output terminals 58, 42 of the tuned circuit 55 to the chrominance-signal detector 21.

During line retrace intervals, the tube 43 is rendered conductive by the gating pulses. When conductive, the tube 43 effectively constitutes an impedance-transforming device having a very low cathode input impedance and thus is effective to substantially damp the tuned circuit 55 to substantially prevent the color-synchronizing component from being developed thereacross and to divert substantially all of the current from the output circuit of unit 19 through the tube 43 to the tuned circuit 45. Because of this action and the fact that the amplifier 19 may be considered as a constant-current type of signal source, there is developed across tuned circuit 45 during the occurrence of the color-synchronizing component a voltage which is much greater than any negligible voltage developed across the tuned circuit 55 due to negligible current flow therethrough. In this manner, during line retrace intervals, the color-synchronizing component is amplified and developed across the tuned circuit 45 and, hence, supplied through the output terminals 44, 42 to the sync burst amplifier 23.

From the foregoing description of the invention, it will be apparent that the described embodiment of the present invention has the advantage that a single-tube circuit provides substantially complete separation of color-synchronizing and video signal components and further serves to amplify one of the signal components.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A circuit for separating the burst and video signals of an NTSC color-television signal comprising: a source of such signals; a normally nonconductive triode having anode and cathode circuits tuned to the subcarrier frequency; connections from the signal source to the cathode circuit so that the cathode circuit is normally energized by the video signals when the triode is nonconductive; and a line-scanning generator connected to the grid of the triode to render the triode conductive during line-scanning flyback periods so that the burst is transmitted to the anode circuit during line-scanning flyback periods and the cathode circuit is damped to render it substantially non-responsive to the burst.

2. A a signal-separating circuit for a color-television receiver for separating the color-synchronizing signal component from the video signal component of a composite color-television signal comprising: circuit means for supplying a composite color-television signal having time-spaced color-synchronizing and video signal components; a first signal-translating channel coupled to said composite-signal supply-circuit means and including repeater-circuit means having first and second operating modes and normally operating in said first mode, one of said operating modes being a translatory operating mode for enabling said first channel to translate only a first of said signal components; circuit means for supplying recurrent gating pulses for enabling said repeater means to operate in said second mode; and a second signal-translating channel coupled to said composite-signal supply-circuit means and coupled to said repeater means and responsive to its other operating mode, such other mode being a nontranslatory operating mode for said repeater means, for translating substantially only a second of said signal components.

3. A signal-separating circuit for a color-television receiver for separating the color-synchronizing signal component from the video signal component of a composite color-television signal comprising: circuit means for supplying a composite color-television signal having time-spaced color-synchronizing and video signal components; a first signal-translating channel coupled to said composite-signal supply-circuit means and including an electron-discharge device having nonconductive and conductive operating modes and normally operating in said nonconductive mode, said conductive operating mode being a translatory operating mode for enabling said first channel to translate only said color-synchronizing signal component; circuit means for supplying recurrent gating pulses for enabling said electron-discharge device to operate in said conductive mode; and a second signal-translating channel coupled to said composite-signal supply-circuit means and coupled to said electron-discharge device and responsive to its nonconductive mode for translating substantially only said video signal component.

4. A signal-separating circuit for a color-television receiver for separating the color-synchronizing signal component from the video signal component of a composite color-television signal comprising: circuit means for supplying a composite color-television signal having time-spaced color-synchronizing and video signal components; a first signal-translating channel coupled to said composite-signal supply-circuit means and including a first tuned circuit and repeater-circuit means having first and second operating modes and normally operating in said first mode, one of said operating modes being a translatory operating mode for enabling said first tuned circuit to develop only a first of said signal components thereacross; circuit means for supplying recurrent gating pulses for enabling said repeater means to operate in said second mode; and a second signal-translating channel including a second tuned circuit coupled to said composite-signal supply-circuit means and coupled to said repeater means and responsive to its other operating mode, such other mode being a nontranslatory operating mode for said repeater means, for developing across said second tuned circuit substantially only a second of said signal components.

5. A signal-separating circuit for a color-television receiver for separating the color-synchronizing signal component from the video signal component of a composite color-television signal comprising: circuit means for supplying a composite color-television signal having time-spaced color-synchronizing and video signal components; a first signal-translating channel coupled to said composite-signal supply-circuit means and including repeater-circuit means having first and second operating modes and normally operating in said first mode, one of said operating modes being a translatory operating mode for enabling said first channel to translate only a first of said signal components; circuit means for supplying recurrent gating pulses for enabling said repeater means to operate in said second mode; and a second signal-translating channel including a tuned circuit coupled to said composite-signal supply-circuit means and coupled to said repeater means and responsive to its other operating mode, such other mode being a nontranslatory operating mode for said repeater means, for developing across said tuned circuit a second of said signal components, said repeater means being effective during its translatory operating mode to substantially damp said tuned circuit to substantially prevent said first signal component from being developed thereacross thereby to enable said second channel to translate substantially only said second signal component.

6. A signal-separating circuit for a color-television receiver for separating the color-synchronizing signal component from the video signal component of a composite color-television signal comprising: circuit means for supplying a composite color-television signal having time-spaced color-synchronizing and video signal components; a first signal-translating channel coupled to said composite-signal supply circuit means and including a first tuned circuit having a predetermined impedance value and an electron-discharge device coupled thereto, and having nonconductive and conductive operating modes and normally operating in said nonconductive mode, said conductive operating mode being a translatory operating mode for enabling said first tuned circuit to develop only said color-synchronizing signal component thereacross; circuit means for supplying recurrent positive gating pulses for enabling said electron-discharge device to operate in said conductive mode; and a second signal-translating channel including a second tuned circuit coupled to said composite-signal supply-circuit means and coupled to said electron-discharge device and responsive to its nonconductive mode for developing across said second tuned circuit said video signal component, said electron-discharge device being effective during its conductive mode for transforming said impedance of said first tuned circuit to substantially damp said second tuned circuit to substantially prevent said color-synchronizing signal component from being developed thereacross, thereby to enable said second channel to translate substantially only said video signal component.

7. A signal-separating circuit for a color-television receiver for separating the color-synchronizing signal component from the video signal component of a composite color-television signal comprising: circuit means for supplying a composite color-television signal having time-spaced color-synchronizing and video signal components; a first channel for translating said color-synchronizing signal component; a second channel for translating said video signal component; an electron-discharge device having a recurrently conductive and non-conductive single electron-discharge path for effectively alternately coupling said composite-signal supply-circuit means to one of said channels during the occurrence of one of said signal components and to the other of said channels during the occurrence of the other of said signal components; and circuit means for supplying recurrent gating signals for enabling the conductivity alternation in said electron-discharge device.

8. A signal-separating circuit for a color-television receiver for separating the color-synchronizing signal component from the video signal component of a composite color-television signal comprising: circuit means for supplying a composite color-television signal having time-spaced color-synchronizing and video signal components; a first channel for translating said color-synchronizing signal component; a second channel for translating said video signal components; an electron-discharge device having a cathode, an anode, and a control electrode said cathode being coupled to said composite-signal supply-circuit means and to said second channel, said anode being coupled to said first channel, said electron-discharge device being recurrently conductive for effectively alternately coupling said composite-signal supply-circuit means to one of said channels during the occurrence of one of said signal components and to the other of said channels during the occurrence of the other of said signal components and for amplifying at least one of said signal components; and circuit means for supplying recurrent gating signals to said control electrode for enabling the conductivity alternation in said electron-discharge device.

9. A signal-separating circuit for a color-television receiver for separating the color-synchronizing signal component from the video signal component of a composite color-television signal comprising: circuit means for supplying a composite color-television signal having time-spaced color-synchronizing and video signal components; a first impedance network for deriving said color-synchronizing signal component; a second impedance network for deriving said video signal component; an impedance coupling electron-discharge device recurrently conductive for effectively recurrently directing said composite signal from one of said networks to the other of said networks during the occurrence of one of said signal components for enabling one network to derive substantially only one of said signal components and the other network to derive substantially only the other of said signal components; and circuit means for supplying recurrent gating signals for enabling the conductivity alternation in said electron-discharge device.

References Cited in the file of this patent

UNITED STATES PATENTS

| | | |
|---|---|---|
| 2,594,380 | Barton | Apr. 19, 1952 |
| 2,653,187 | Luck | Sept. 22, 1953 |
| 2,666,136 | Carpenter | Jan. 12, 1954 |